United States Patent
Le Pennec et al.

(10) Patent No.: US 8,634,428 B2
(45) Date of Patent: Jan. 21, 2014

(54) METHOD AND SYSTEM FOR SYMMETRIC ROUTING

(75) Inventors: Jean-Francois Le Pennec, Nice (FR);
Aurelien Bruno, Colomars (FR);
Nicolas Grisi, La Colle sur Loup (FR)

(73) Assignee: AT&T Intellectual Property I, L.P., Atlanta, GA (US)

( * ) Notice: Subject to any disclaimer, the term of this patent is extended or adjusted under 35 U.S.C. 154(b) by 945 days.

(21) Appl. No.: 12/582,018

(22) Filed: Oct. 20, 2009

(65) Prior Publication Data

US 2011/0069714 A1    Mar. 24, 2011

(30) Foreign Application Priority Data

Sep. 21, 2009 (FR) ...................... 09 56460

(51) Int. Cl.
*H04L 12/28* (2006.01)
*H04L 12/56* (2011.01)
(52) U.S. Cl.
USPC ............................ 370/401; 370/389; 370/392
(58) Field of Classification Search
None
See application file for complete search history.

(56) References Cited

U.S. PATENT DOCUMENTS

| 6,466,985 | B1 |  | 10/2002 | Goyal et al. |  |
|---|---|---|---|---|---|
| 2005/0030921 | A1 | * | 2/2005 | Yau | 370/329 |
| 2011/0164527 | A1 | * | 7/2011 | Mishra et al. | 370/252 |

FOREIGN PATENT DOCUMENTS

WO    2004056051 A1    7/2004

OTHER PUBLICATIONS

Perkins, C. et al., "RFC 3561: Ad hoc On-Demand Distance Vector (AODV) Routing", Jul. 2003, The Internet Society.*
Perkins et al. (RFC 3561, "Ad hoc On-Demand Distance Vector (AODV) Routing"), Jul. 2003, The Internet Society.*
Perkins, C. et al., "RFC 3561: Ad hoc On-Demand Distance Vector (AODV) Routing", Jul. 2003, XP002338673, http://www.ietf.org/rfc/rfc3561.txt.
Search Report issued by the European Patent Office for counterpart French Application No. 0956460.

* cited by examiner

*Primary Examiner* — Jae Y Lee
(74) *Attorney, Agent, or Firm* — Hoffmann & Baron, LLP

(57) ABSTRACT

The present invention includes a method, a system, and a computer readable medium for establishing a connection between hosts in a computer network with the connection configured for symmetrical forward and reverse routing. The method uses the following steps. First, a first host local routing table to route a packet from a first host to a first gateway according to a routing protocol. Next, the first gateway local routing table routes the packet from the first gateway to a first access router. After that, a first access router local routing table routes the packet from the first access router to a second access router. Then, a second access router local routing table routes the packet from the second access router to a second gateway. Finally, a second gateway local routing table routes the packet from the second gateway router to a second host.

20 Claims, 5 Drawing Sheets

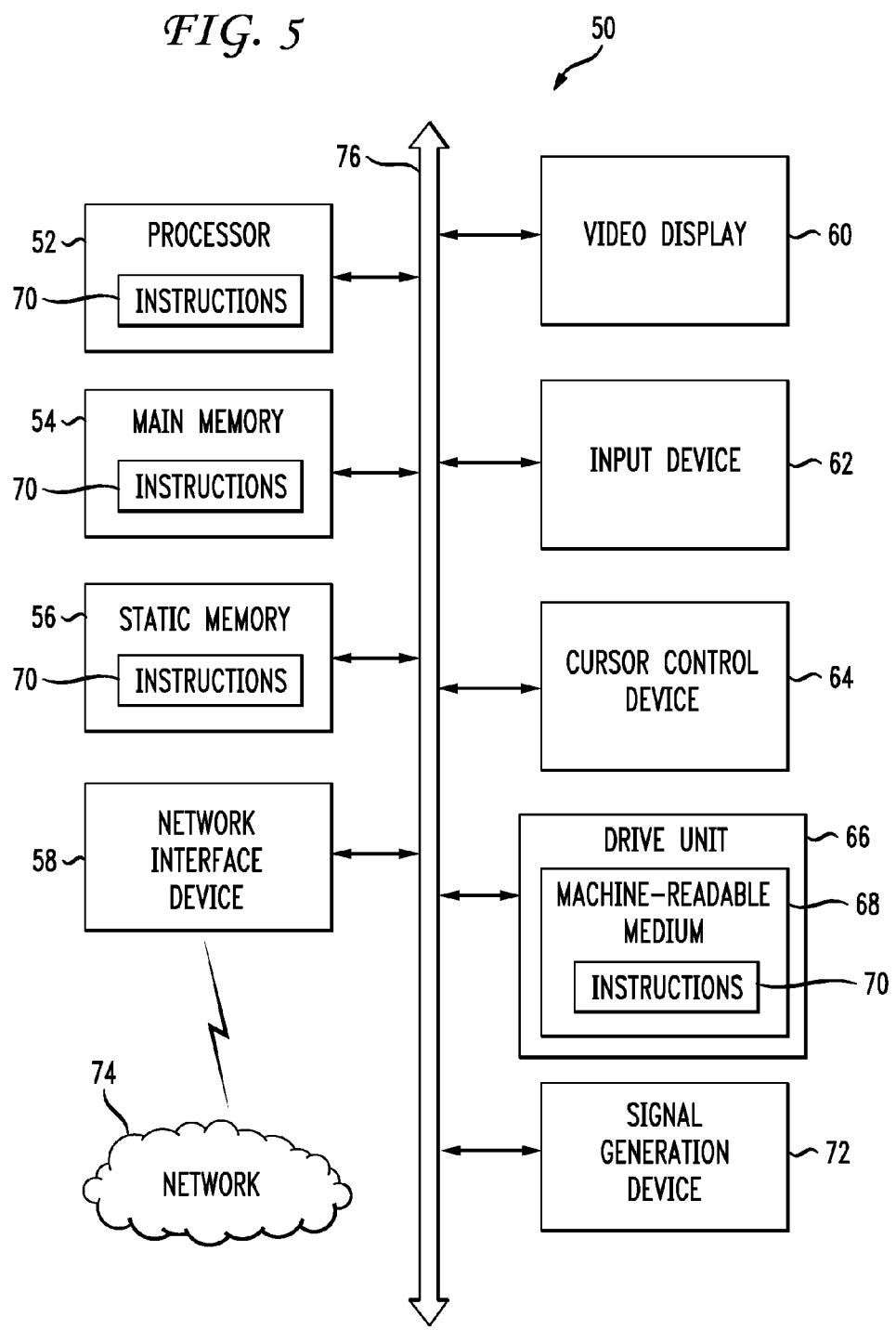

METHOD AND SYSTEM FOR SYMMETRIC ROUTING

CROSS REFERENCE TO RELATED APPLICATION

This application claims priority to French Patent Application No. 0956460 filed on Sep. 21, 2009, which is incorporated by referenced herein in its entirety.

BACKGROUND

1. Field

The present application relates to a method for symmetrically routing traffic in a network. More particularly, the present application relates to a method for building both forward and reverse paths in the network similar using a stateful routing mechanism.

2. Brief Description of the Related Art

Routing is the act of moving information across a computer network from a source to a destination. Along the way, at least one intermediate node is typically encountered. Routing occurs at the network layer (or Layer 3). Routing protocols use metrics to evaluate what path will be the best for a packet to travel. A metric is a standard of measurement, such as a path bandwidth, that is used by routing algorithms to determine the optimal path to a destination. To aid the process of path determination, routing algorithms initialize and maintain routing tables, which contain the routing information. Routing information varies depending on the routing algorithm used.

Routing tables contain information used by switching software to select the best route. Routing algorithms fill routing tables with a variety of information including a destination address and a next hop. An association between the destination address and the next hop tells a router that a particular destination can be reached optimally by sending the packet to a particular router representing the "next hop" on the path to the final destination. When a router receives an incoming packet, it checks the destination address and attempts to associate this address with the next hop. Routing tables may further contain additional information, such as data about the desirability of a path. Optimal routes are then determined by a comparison of metrics, as defined by each particular routing algorithm.

The routers communicate with one another and maintain their routing tables through the transmission of a variety of messages. A routing update message is one such message that generally consists of all or a portion of a routing table. By analyzing routing updates from all other routers, a router can build a detailed picture of network topology. A link-state advertisement, another example of a message sent between routers, informs other routers of the state of the sender's links. Link information also can be used to build a complete picture of network topology to enable routers to determine optimal routes to network destinations.

Routing algorithms have used many different metrics to determine the best route. Sophisticated routing algorithms can base route selection on multiple metrics by combining these metrics in a single (hybrid) metric. Examples of metrics used include path length, reliability, delay, bandwidth, load, and communication cost. Symmetrical routing is usually not a requirement for standard routing protocols/algorithms, and upper layers of the network have been designed with this assumption. Thus, asymmetrical routes are common in the real-world Internet.

Symmetrical routing uses the same forward and reverse path. Even if link costs are symmetrical, studies having shown that most routing protocols make no effort to compute symmetrical routes. Thus, most paths through the Internet are routed asymmetrically, providing significantly different forward and reverse paths. For example, if multiple shortest path routes exist, arbitrary tiebreakers can lead to asymmetrical routes. In some cases, routing protocols deliberately compute asymmetrical routes because of policy constraints.

One of the only ways for upper layers of the network to enforce symmetrical routing is to use Internet Protocol (IP) source routing, but almost no network backbone operator supports that option. Source routing is an IP option that allows the originator of a packet to specify what path that packet will take in the forward direction, and what path return packets sent back to the originator will take. Source routing is useful when the default route of a connection fails or is suboptimal for some reason, or for network diagnostic purposes. Traceroute is a program currently available that may be used for tracing forward network paths, which may be useful for network diagnostics. Traceroute provides the ability to track the route of packets from a first host to a second host, but only for the forward path. It is not possible to assume that the reverse path is the same. Therefore, it is difficult to analyze problems, even using Traceroute when the two paths are different. In order to use Traceroute to analyze problems, the capability to issue traceroute commands from the remote device is required to see the backward path.

Most standard routing protocols deal well with asymmetrical link costs for computing routes between a single source and a single destination; however, many multicast routing algorithms tacitly assume link asymmetry. Current routing protocols do not take into account symmetrical path requirements. Routing symmetry is important, especially for some applications, such as Network Time Protocol (NTP) and Multicast Backbone (MBONE), which depend on symmetrical routing. Thus, an efficient symmetric routing method is desirable.

SUMMARY

The present application describes a method for establishing a connection between hosts in a computer network with the connection configured for symmetrical forward and reverse routing. The method uses a first host local routing table to route a packet from a first host to a first gateway according to a routing protocol. Next, the method uses the first gateway local routing table to route the packet from the first gateway to a first access router. After that, the method uses a first access router local routing table to route the packet from the first access router to a second access router. Then, the method uses a second access router local routing table to route the packet from the second access router to a second gateway. The second access router is configured to generate a second access router stateful symmetrical routing table with at least one new parameter to force symmetrical reverse routing from the second gateway to the second access router. Finally, the method uses a second gateway local routing table to route the packet from the second gateway router to a second host. The second gateway router is configured to generate a second gateway stateful symmetrical routing table with the at least one new parameter to force symmetrical reverse routing from the second host to the second gateway. The method enables each of the stateful symmetrical routing tables to change a corresponding local routing table by updating the local routing tables using reverse routing according to a source address associated with the packet.

The present application further describes a computer-readable medium including instructions, that when executed by at least one computing device establishes a connection between two hosts for symmetrical forward and reverse routing. The symmetrical and reverse routing is accomplished by: using a first host local routing table to route a packet from a first host to a first gateway according to a routing protocol; using the first gateway local routing table to route the packet from the first gateway to a first access router; using a first access router local routing table to route the packet from the first access router to a second access router; using a second access router local routing table to route the packet from the second access router to a second gateway, with the second access router configured to generate a second access router stateful symmetrical routing table with at least one new parameter to force symmetrical reverse routing from the second gateway to the second access router; and using a second gateway local routing table to route the packet from the second gateway router to a second host with the second gateway router configured to generate a second gateway stateful symmetrical routing table with the at least one new parameter to force symmetrical reverse routing from the second host to the second gateway. The instructions are configured to enable each of the stateful symmetrical routing tables to change a corresponding local routing table by updating the local routing tables using reverse routing according to a source address associated with the packet.

The present disclosure yet further describes a system for establishing a connection between two hosts for symmetrical forward and reverse routing. The system includes the two hosts; a network between the two hosts configured for transmission of packets therebetween; and a set of nodes each node having a stateful symmetrical routing table and a local routing table. The set of nodes including two gateways and at least two access routers. The system provides for symmetrical forward and reverse routing by: using a first host local routing table to route a packet from a first host to a first gateway according to a routing protocol; using the first gateway local routing table to route the packet from the first gateway to a first access router; using a first access router local routing table to route the packet from the first access router to a second access router; using a second access router local routing table to route the packet from the second access router to a second gateway with the second access router configured to generate a second access router stateful symmetrical routing table with at least one new parameter to force symmetrical reverse routing from the second gateway to the second access router; and using a second gateway local routing table to route the packet from the second gateway router to a second host with the second gateway router configured to generate a second gateway stateful symmetrical routing table with the at least one new parameter to force symmetrical reverse routing from the second host to the second gateway. The system is configured such that each of the stateful symmetrical routing tables change a corresponding local routing table by updating the local routing tables using reverse routing according to a source address associated with the packet.

Other objects and features of the present application will become apparent from the following detailed description considered in conjunction with the accompanying drawings. It is to be understood, however, that the drawings are designed as an illustration only and not as a definition of the limits of the application.

BRIEF DESCRIPTION OF THE DRAWINGS

FIG. 5 shows a computer system configured to perform one or more methods disclosed herein.

DETAILED DESCRIPTION

Figure 1:
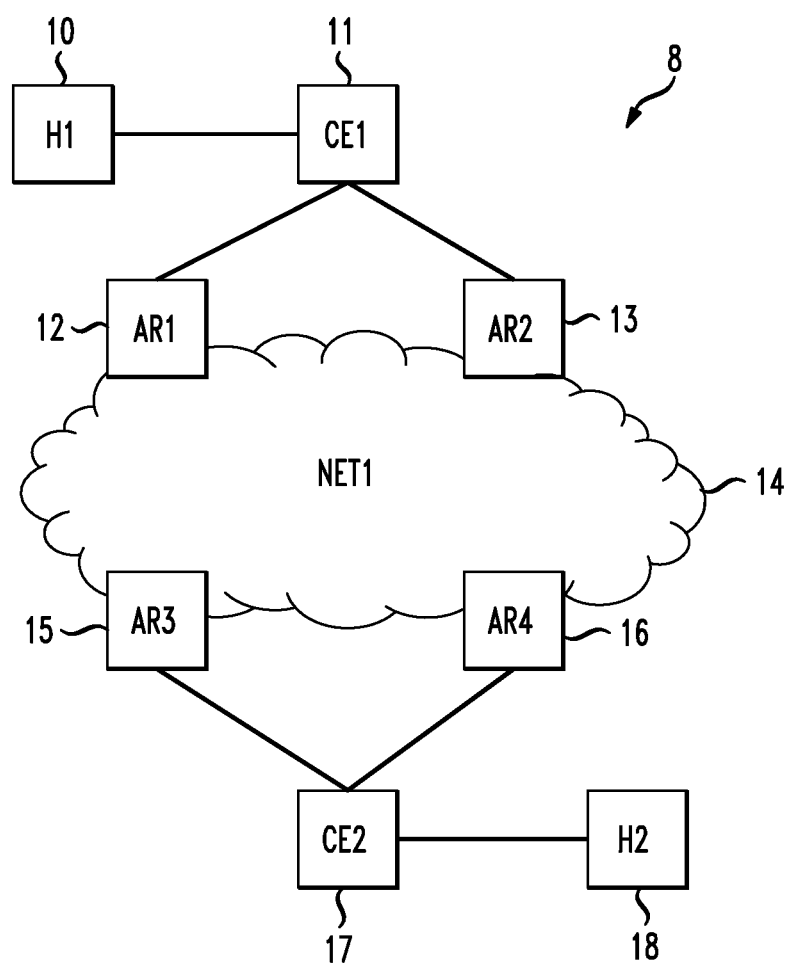
FIG. 1 shows conventional routing mechanisms having a global network with a workstation on a private network that is configured to access a server.

It is an object of the current disclosure to provide symmetric routing for a selected set of flows in building symmetric routing state tables. The flows in intermediate nodes are adapted for symmetrical reverse routing while the forward path from source to destination is built using normal routing protocols.

One way to accomplish this is through the use of a stateful mechanism used in firewalls, which have commonly been implemented in networking for security reasons. The stateful mechanism may help to create a new symmetric routing mechanism compatible with current routing protocols. Stateful firewalls are firewalls that keep track of the state of network connections, such as Transmission Control Protocol (TCP) streams traveling across it. The firewall is programmed to identify legitimate packets for different types of connections. Only packets matching a known connection will be allowed by the firewall; others will be rejected. A stateful firewall is able to store significant attributes of each connection from start to finish in memory. These attributes, which are collectively known as the state of the connection, may include such details as the IP addresses and ports involved in the connection, and the sequence numbers of the packets traversing the connection. The most Central Processing Unit (CPU)-intensive checking is performed at the time of setup of the connection. All packets after that, for a particular session, are processed rapidly because it is simple and fast to determine whether any packet belongs to an existing, pre-screened session. Once the session has ended, generally managed by internal timers, its entry in the state table is discarded. The entry is removed for both directions. If the session restarts, then the same process will create a new entry in the table that may or may not use the same path depending on the routing rules at the time the entry is created.

The stateful firewall depends on a three-way handshake of the TCP protocol. When a client initiates a new connection, it sends a packet with synchronization (SYN) bit set in the packet header. All packets with the SYN bit set are considered by the firewall as NEW connections. If the service that the client has requested is available on the server, the service will reply to the SYN packet with a packet in which both the SYN and acknowledgement (ACK) bits are set. The client will then respond with a packet in which only the ACK bit is set, and the connection will enter an ESTABLISHED state. Such a firewall will allow all outgoing packets to pass through, but will only allow incoming packets if they are part of an ESTABLISHED connection, which ensures that hackers cannot start unsolicited connections with a protected machine.

However, only stateful firewalls require adaption to avoid problems, such as the outgoing traffic leaving the firewall using one path and the incoming traffic not using the same return path, thereby bypassing the firewall that was used to build the state of the connection. When the firewall that built the state of the connection is bypassed, the connection is disrupted and the traffic is blocked. If the identification of the problem is different, the routing must be modified to allow the connection to go through a single firewall for both incoming and outgoing traffic to meet stateful rules.

The present disclosure provides for using a stateful routing mechanism to force both a forward path and a reverse path to be similar by using a stateful symmetrical routing table to assign the next output path for use by the reverse traffic based on the input path of the forward traffic. Such a configuration results in selection of the same end-to-end path for both forward and reverse traffic. In such mechanisms, only the forward traffic uses legacy or existing routing tables to identify the forward path, while reverse traffic uses stateful symmetrical routing tables defined by the forward traffic, rather than local routing tables.

FIG. 1 provides a simplified network with two hosts, H1 10 and H2 18 capable of establishing a communication by H1 10 sending a first packet to H2 18. The configuration of FIG. 1 provides several possible paths with a single local router acting as a default gateway CE1 11 available on the H1 10 side and a similar default gateway CE2 17 on the H2 18 side. A backbone of the network is represented by four access routers AR1 12 and AR2 13, which are connected to CE1 11, and AR3 15 and AR4 16, which are connected to CE2 17.

A middle of the network, NET1 14 may contain other devices, which do not affect the principle of the invention. For example, the NET1 14 may be a Multiprotocol Label Switching (MPLS) network, in which all access routers are Provider Edge (PE) routers and the nodes in the NET1 14 are Provider (P) routers. All the P routers are by inception transparent to such routing mechanisms, as the routing plane is different in the core MPLS network.

Using the example network of FIG. 1, there are at least four possible paths between H1 10 and H2 18. The possible paths include: H1-CE1-AR1-AR3-CE2-H2; H1-CE1-AR1-AR4-CE2-H2; H1-CE1-AR2-AR3-CE2-H2; and H1-CE1-AR2-AR4-CE2-H2. For illustrative purposes, it is assumed that the routing protocol used on this network selects the path H1-CE1-AR1-AR4-CE2-H2. It should be noted that in a typical protocol, the reverse path from H2 18 to H1 10 may be any of the four possible paths as determined by the routing protocol, with each path direction having its own route settings.

Figure 2:
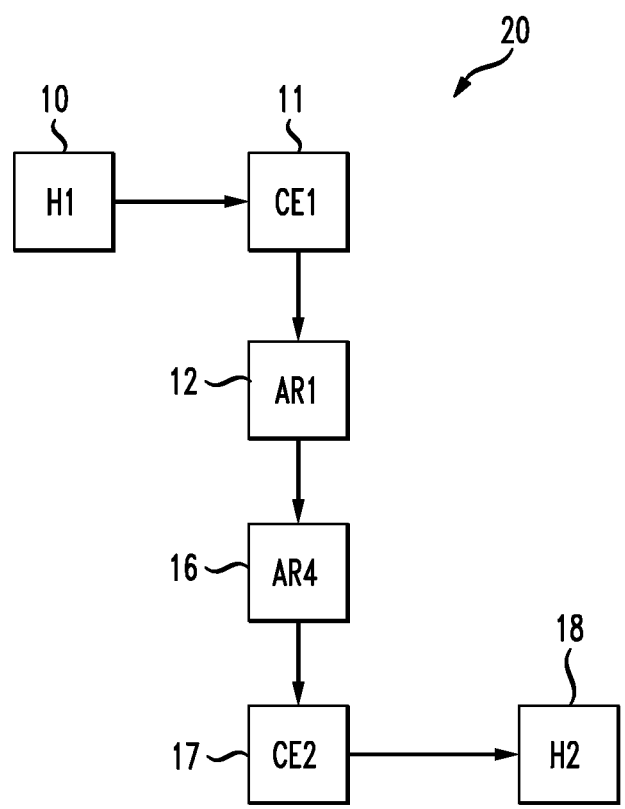
FIG. 2 depicts a normal transmit path and forwarding process using legacy routing information.

FIG. 2 provides the forward path of the packet from H1 10 to H2 18. The forward path 20 is determined by a local routing table at each node of the path. Assuming the local routing table at each node of the path sends the packet as shown in FIG. 2, the details on the method for moving the packet is described herein.

The packet is sent from the host H1 10 to a first gateway CE1 11, which is transparent to the symmetric path because there is no alternate reverse path from CE1 11 to H1 10. According to local routing rules, the packet is then sent from CE1 11 to an access router, AR1 12. The detection of a flow from CE1 11 to AR1 12 may define an access list if the flow is new and then a stateful symmetrical routing table may be created for the reverse route. The stateful symmetrical routing table may change a corresponding local routing table at the AR1 node by updating the local routing table for reverse routing according to a source of the packet.

However, the creation of the stateful symmetrical routing table is not necessary on node AR1 12 because there is only a single direct path to CE1 11, if the protocol routing is well defined. Thus, the creation of a stateful symmetrical routing table is optional when the node only has one option for a node in a reverse direction.

The method continues sending the packet from AR1 12 to AR4 16. As described above, the direction of a flow from AR1 12 to AR4 16 may define an access list, if the flow is new, and then a stateful symmetrical routing table may be created. The stateful symmetrical routing table may change a corresponding local routing table at the AR1 12 node by updating the local routing table for reverse routing according to a source of the packet.

After that, the method between nodes AR4 16 and CE2 17 is similar to that described between AR1 12 and AR4 16, and CE1 11 and AR1 12. Note that the stateful symmetrical routing table needs to be created between AR4 16 and CE2 17 in the forward direction because when the path is reversed, the packet at CE2 17 has the option of going to AR3 15 or AR4 16 unless the stateful symmetrical routing table provides an update to the local table. Finally, the packet is sent to host H2 18, which is also transparent to a symmetrical path.

Figure 3:
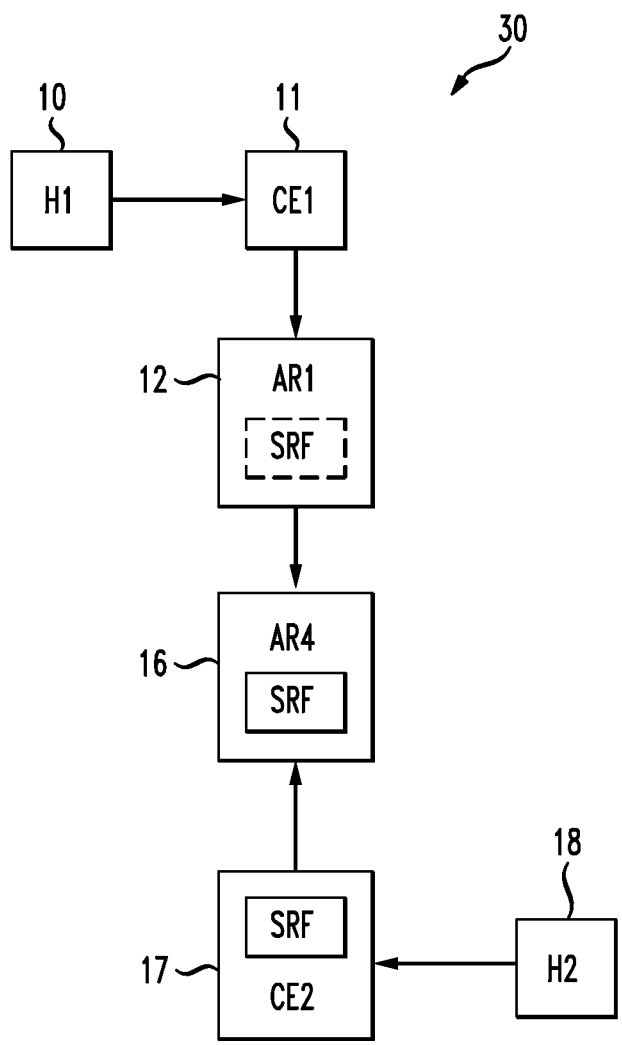
FIG. 3 depicts a symmetric reversed forwarding path and an associated process for using stateful symmetrical routing tables.

FIG. 3 shows the reverse path 30 from H2 18 to H1 10. The reverse routing of a packet is the same as described in FIG. 2, except the reverse route is not determined by the routing algorithm protocol, but is instead determined by a stateful symmetrical routing table. In all intermediate nodes of the network, such as CE2 17, AR4 16, and AR1 12, the stateful routing forwarding table and the local routing table are updated with at least one new parameter to force symmetric routing. The reverse routing of the packet will then follow the same path as the packets coming from H1 10 to H2 18, but in reverse order, H2-CB2-AR4-AR1-CE1-H1. The reverse routing path between AR1 12 and CE1 11 does not require a specific routing protocol to be defined since there is no alternate route. Similarly, H1 10 is locally attached to CE1 11; thus, no routing is required to be defined with respect to H1 10.

Figure 4:
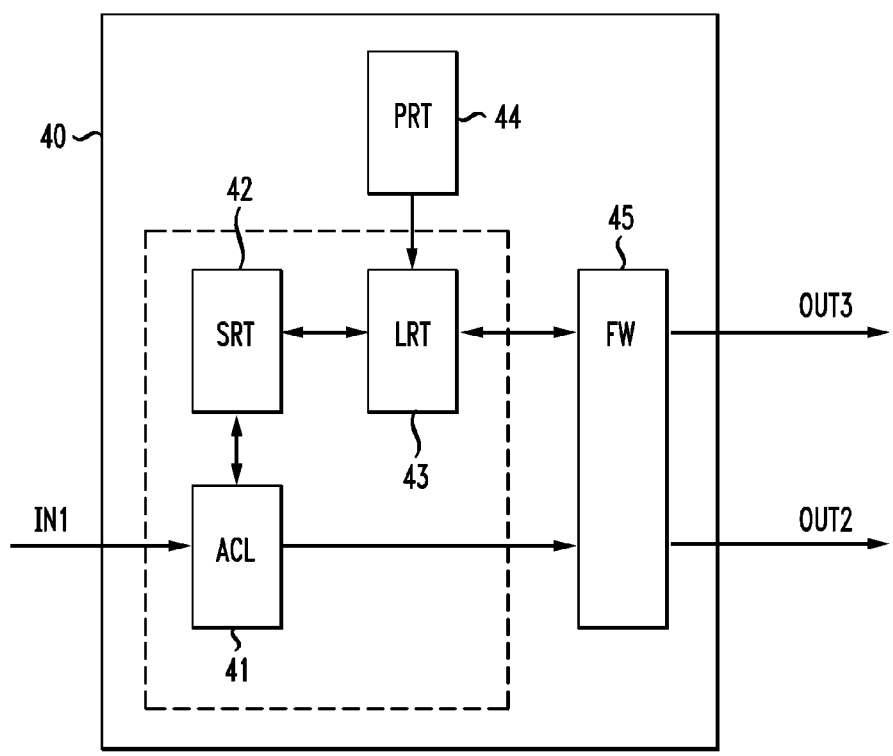
FIG. 4 shows the logical implementation of the stateful symmetrical routing process within a node (router) with the different building blocks involved in the process.

FIG. 4 provides a simplified version of a node architecture 40, which may be applicable to the nodes of the network provided in FIG. 1, specifically nodes AR1 12, AR4 16, and CE2 17. The packet flow is represented by bold arrow lines, while the control elements are shown using blocks. Only one direction is shown because the building blocks for reverse routing are exactly the same. The same process is followed through a node architecture when packets that enter nodes from a LAN interface or a WAN interface.

When the packet enters a node, for example, through port INL the packet is first checked using an access list device (ACL) 41. This allows for keeping some flows based on asymmetric routing and other flows to be forced to provide symmetric routing. If a match exists and this match corresponds to an active asymmetric path or no path defined, then a stateful symmetric routing table device (SRT) 42 is updated a first time. Subsequent packets will then be checked by the ACL 41, but this will not result in a SRT 42 update as long as the same flow is processed. The SRT 42 may further include a timer configured to clear elements after a predefined time of inactivity. This timer is reset each time a packet is detected by SRT 42, even if no table update is performed. Moreover, the SRT 42 may also be cleared if a local routing table device (LRT) 43 is cleared.

The LRT 43 initially contains all the routing information computed by the protocol routing engine contained in the protocol routing table (PRT) 44 plus some static definitions contained in the node configuration. It is assumed that only one routing protocol is used, but one skilled in the art would know that more than one protocol could be used, as there is only one LRT 43 in a node or logical routing entity within a node.

If the present node of the reverse path does not contain an alternate route and/or path, the SRT 42 is updated. A memory element within the SRT 42 contains several parameters: the source address, the destination address, the input port within the node, and optionally the protocol number plus a field used to check for expiration of the element. The memory element may be configured to expire, for example, after a pre-defined time of inactivity. The SRT 42 updates the LRT 43 by using the source address and defining that packet as having the destination address of the current node, which results in the SRT 42 changing the LRT 43 such that the source address of the packet becomes the destination address to allow for the packet to be forwarded to the port defined by the element. Thus, the process has no effect on the packet as it is sent along the forward path, but is used only to manage the packets in the reverse path differently, i.e., the source and destination addresses are inverted compared to packets in the forward path.

Using the method described herein, there is no need for ACL 41 control of the packets in the reverse path, as the routing table update is performed by packets coming from the other direction. However, if there is a need to provide asymmetric routing, the ACL 41 may be additionally set for the reverse direction. If the ACL 41 is set, then the SRT 42 is not updated, even if the SRT 42 contains an element with both a qualified IP address source and a qualified IP address destination.

After being tested by the ACL 41, a packet is sent to a forwarded engine (FW) 45. Then, the packet is sent to one of the outputs, such as OUT2 or OUT3 depending on the setting defined by the LRT 43.

The proposed mechanism for routing using the stateful symmetrical routing tables is compatible with any routing protocol, such as Routing Information Protocol (RIP), Open Shortest Path First (OSPF), Boarder Gateway Protocol (BGP), and even static routes defined in an asymmetric manner. FIG. 5 is a block diagram of a general computer system 50. The computer system 50 can include a set of instructions that can be executed to cause the computer system 50 to perform any one or more of the methods or computer based functions disclosed herein with respect to FIGS. 1-4. The computer system 50, or any portion thereof, may operate as a standalone device or may be connected, e.g., using a network 74, to other computer systems or devices disclosed herein with respect to FIGS. 1-4. For example, the computer system 50 may include or be included within any one or more of the systems, networks, hosts, routers, servers, proxy devices, or any other devices disclosed herein with respect to FIGS. 1-4.

In a networked deployment, the computer system 50 may operate in the capacity of a server or a client machine in a server-client network environment, or a peer machine in a peer-to-peer (or distributed) network environment. The computer system 50 can also be implemented as or incorporated into various devices, such as a personal computer (PC), a tablet PC, a personal digital assistant (PDA), a web appliance, a communications device, a mobile device, a wireless telephone, a control system, a network router, switch or bridge, or any other machine capable of executing a set of instructions (sequential or otherwise) that specify actions to be taken by that machine. Further, while a single computer system 50 is illustrated, the term "system" shall also be taken to include any collection of systems or sub-systems that individually or jointly execute a set, or multiple sets, of instructions to perform one or more computer functions.

As illustrated in FIG. 5, the computer system 50 may include a processor 52, e.g., a central processing unit (CPU), a graphics-processing unit (GPU), or both. Moreover, the computer system 50 can include a main memory 54 and a static memory 56 that can communicate with each other via a bus 76. As shown, the computer system 50 may further include a video display unit 60, such as a liquid crystal display (LCD), an organic light emitting diode (OLED), a flat panel display, a solid state display, or a cathode ray tube (CRT). Additionally, the computer system 50 may include an input device 62, such as a keyboard, and a cursor control device 64, such as a mouse. The computer system 50 can also include a disk drive unit 66, a signal generation device 72, such as a speaker or remote control, and a network interface device 58.

In a particular embodiment, as depicted in FIG. 5, the disk drive unit 66 may include a machine or computer-readable medium 68 in which one or more sets of instructions 70 (e.g., software) can be embedded. Further, the instructions 70 may embody one or more of the methods or logic as described herein with reference to FIGS. 1-4. In a particular embodiment, the instructions 70 may reside completely, or at least partially, within the main memory 54, the static memory 56, and/or within the processor 52 during execution by the computer system 50. The main memory 54 and the processor 52 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with the various embodiments, the methods described herein may be implemented by software programs that are tangibly embodied in a processor-readable medium and that may be executed by a processor. Further, in an example, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software which implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Thus, a method and system for symmetrically routing traffic in a network has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

What is claimed is:

1. A method of establishing a connection between hosts in a computer network, the connection providing symmetrical forward and reverse routing, the method comprising:

routing, using a first host local routing table, a packet from a first host to a first gateway according to a routing protocol;

routing, using a first gateway local routing table, the packet from the first gateway to a first access router;

routing, using a first access router local routing table, the packet from the first access router to a second access router;

routing, using a second access router local routing table, the packet from the second access router to a second gateway, the second access router generating a second access router stateful symmetrical routing table with a new parameter to force symmetrical reverse routing from the second gateway to the second access router only if an alternate route from the second gateway to the first host exists that does not include the second access router, thereby avoiding addition of redundant information in the second access router stateful symmetrical routing table; and routing, using a second gateway local routing table, the packet from the second gateway to a second host, the second gateway generating a second gateway stateful symmetrical routing table with the new parameter to force symmetrical reverse routing from the second host to the second gateway only if an alternate route from the second host to the first host exists that does not include the second gateway, thereby avoiding addition of redundant information in the second gateway stateful symmetrical routing table, wherein each of the stateful symmetrical routing tables changes a corresponding local routing table by updating the local routing tables using reverse routing according to a source address associated with the packet.

2. The method of claim 1, further comprising the first access router generating a first access router symmetrical stateful symmetrical routing table with the new parameter to force symmetrical reverse routing from the first access router to the first gateway.

3. The method of claim 1, wherein the new parameter comprises a source address, a destination address, and an import port within a node.

4. The method of claim 3, wherein the new parameter comprises a protocol number and an expiration field.

5. The method of claim 1, wherein generating the second access stateful symmetrical routing table further comprises changing a second router destination address of a second access router local routing table for reverse routing to the source address of the packet, and wherein generating the second gateway stateful symmetrical routing table further comprises changing a second gateway destination of a second gateway local routing table for reverse routing to the source address of the packet.

6. The method of claim 5, further comprising reverse routing, using the second access router stateful symmetrical routing table and the second gateway routing table, of the packet.

7. A computer-readable medium comprising instructions, that when executed by a processing device establish a connection between two hosts to provide symmetrical forward and reverse routing by performing operations comprising:
   routing, using a first host local routing table, a packet from a first host to a first gateway according to a routing protocol;
   routing, using a first gateway local routing table, the packet from the first gateway to a first access router;
   routing, using a first access router local routing table, the packet from the first access router to a second access router;
   routing, using a second access router local routing table, the packet from the second access router to a second gateway, the second access router generating a second access router stateful symmetrical routing table with a new parameter to force symmetrical reverse routing from the second gateway to the second access router only if an alternate route from the second gateway to the first host exists that does not include the second access router, thereby avoiding addition of redundant information in the second access router stateful symmetrical routing table; and
   routing, using a second gateway local routing table, the packet from the second gateway to a second host, the second gateway generating a second gateway stateful symmetrical routing table with the new parameter to force symmetrical reverse routing from the second host to the second gateway only if an alternate route from the second host to the first host exists that does not include the second gateway, thereby avoiding addition of redundant information in the second gateway stateful symmetrical routing table,
   wherein each of the stateful symmetrical routing tables changes a corresponding local routing table by updating the local routing tables using reverse routing according to a source address associated with the packet.

8. The computer readable medium of claim 7, wherein the operations further comprise the first access router generating a first access router symmetrical stateful symmetrical routing table with the new parameter to force symmetrical reverse routing from the first access router to the first gateway.

9. The computer readable medium of claim 7, wherein the new parameter comprises a source address, a destination address, and an import port within a node.

10. The computer readable medium of claim 9, wherein the new parameter further comprises a protocol number and an expiration field.

11. The computer readable medium of claim 7, wherein the second access router generating the second access stateful symmetrical routing table further comprises changing a second router destination address of a second access router local routing table for reverse routing to the source address of the packet, and wherein creating the second gateway stateful symmetrical routing table further comprises changing a second gateway destination of a second gateway local routing table for reverse routing to the source address of the packet.

12. The computer readable medium of claim 11, wherein the operations further comprise using the second access router stateful symmetrical routing table and the second gateway routing table for reverse routing of the packet.

13. A system to establish a connection between two hosts to provide symmetrical forward and reverse routing comprising:
    a network between two hosts to transmit packets between the two hosts; and
    a set of nodes, each node having a stateful symmetrical routing table and a local routing table, the set of nodes comprising two gateways and two access routers,
    wherein the system provides symmetrical forward and reverse routing by performing operations comprising:
    routing, using a first host local routing table, a packet from a first host to a first gateway according to a routing protocol;
    routing, using a first gateway local routing table, the packet from the first gateway to a first access router;
    routing, using a first access router local routing table, the packet from the first access router to a second access router;
    routing, using a second access router local routing table, the packet from the second access router to a second gateway, the second access router generating a second access router stateful symmetrical routing table with a new parameter to force symmetrical reverse routing from the second gateway to the second access router only if an alternate route from the second gateway to the first host exists that does not include the second access router, thereby avoiding addition of redundant information in the second access router stateful symmetrical routing table; and
    routing, using a second gateway local routing table, the packet from the second gateway to a second host, the second gateway generating a second gateway stateful symmetrical routing table with the new parameter to force symmetrical reverse routing from the second host to the second gateway only if an alternate route from the second host to the first host exists that does not include the second gateway, thereby avoiding addition of redundant information in the second gateway stateful symmetrical routing table,
    wherein each of the stateful symmetrical routing tables changes a corresponding local routing table by updating the local routing tables using reverse routing according to a source address associated with the packet.

14. The system of claim 13, wherein one of the two hosts is locally connected to the first gateway and one of the two hosts is locally connected to the second gateway.

15. The system of claim 13, wherein each of the nodes comprises an access list, a protocol routing table, and a forwarded engine.

16. The system of claim 13, wherein, between the first gateway and the first access router, the first access router generates a first access router symmetrical stateful symmetrical routing table with the new parameter to force symmetrical reverse routing from the first access router to the first gateway.

17. The system of claim 13, wherein the new parameter comprises a source address, a destination address, and an import port within each node.

18. The system of claim 17, wherein the new parameter further comprises a protocol number and an expiration field.

19. The system of claim 13, wherein creation of the second access stateful symmetrical routing table changes a second router destination address of a second access router local routing table for reverse routing to the source address of the packet creation of the second gateway stateful symmetrical routing table changing a second gateway destination of a second gateway local routing table for reverse routing to the source address of the packet.

20. The system of claim 19, wherein the second access router stateful symmetrical routing table and the second gateway routing table are used to reverse route the packet.

\* \* \* \* \*